INVENTORS
FELIX L. YERZLEY
RALPH R. ROBERTS

Nov. 28, 1967

F. L. YERZLEY ET AL

3,354,701

MECHANICAL OSCILLOGRAPHS

Filed Feb. 18, 1965

INVENTORS
FELIX L. YERZLEY
RALPH R. ROBERTS

INVENTORS
FELIX L. YERZLEY
RALPH R. ROBERTS

United States Patent Office 3,354,701
Patented Nov. 28, 1967

3,354,701
MECHANICAL OSCILLOGRAPHS
Felix L. Yerzley, 66 Harrison St., Verona, N.J. 07044, and Ralph R. Roberts, Glen Rock, N.J. (48 Winding Way, Upper Saddle River, N.J. 07458)
Filed Feb. 18, 1965, Ser. No. 433,612
15 Claims. (Cl. 73—88)

ABSTRACT OF THE DISCLOSURE

A test oscillograph having a knife-edge supported balance beam having an infinitely-variable located weight support providing the load for the test to be placed as desired in respect to the knife edge; a slip arm mounted on the beam and rotatable from a non-load to a load position; a chronograph drum readily removable from an attached base support; a drive train in the base support and rotating the chart drum, the drive train including slip clutch for permitting the drum to be hand rotated to precisely align an arm carried pen to chart markings, and a lift support for simultaneously engaging and raising to a non-engaged position the knife edges of the beam and the loading platen from their support surfaces.

---

This invention relates to mechanical oscillographs and in particular to those adapted for measuring the mechanical properties of elastomeric vulcanizates.

More particularly our invention relates to improvements in a mechanical testing apparatus identified as "the Yerzley Mechanical Oscillograph" in A.S.T.M. (Am. Society for Testing Materials, 1916 Race St., Philadelphia, Pa.) publication D945–59, this publication becoming a part of this specification. This apparatus is the adopted standard for this Society and provides an established method of test. The improvements embodied in this invention are to provide apparatus in which certain potential inaccuracies are eliminated and in which a greater versatility and scope of testing procedures is available.

Even more particularly this invention relates to a mechanical oscillograph in which operative improvements include a more precise and renewable knife edge supporting means; a variable weight support and intermediate weight supports enabling the weights providing the load for the test to be placed nearer the knife support and/or at infinitely variable locations from an established distance to a proximate location near the knife support; a flip-arm mounted on the balance beam and adapted to be rotated from a non-load to a load position to shift the center of gravity of the beam and attached components; a chronograph drum readily removable from a supporting power base, the drum carrying a chronograph chart; magnetic clip means for retaining this chart on the drum; a drive train for rotating the chart drum, said train including an adjustable slip clutch to permit the drum to be hand rotated to precisely align the pen on the balance beam with certain selected and desired graph markings on the chart; and means for lifting the knife edges of the balance beam and the second knife-edge of the loading platen from their respective support surfaces so as to permit cleaning and reduce wear and damage when the apparatus is stored and moved.

The "Yerzley Mechanical Oscillograph" specified and identified in the ASTM standard test method D945–59 and which is used for determining the mechanical properties of elastomeric vulcanizates provides a base carrying a balance beam supported at its center by knife edges. Carried on this balance beam at a predetermined distance from the beam knife edge is a knife-edge supported stabilizing arm which is used to provide parallelism in the test piece retaining apparatus. Prescribed checking procedures are used to check the beam for friction and balance and to insure that excessive wear is prevented. The use and development of many new elastomeric vulcanizates, new type plastics and of more precisely calibrated springs having the same deflection properties and characteristics has made the use of the mechanical oscillograph a greater necessity than ever before. As the limits in the test method have been exceeded or nearly exceeded in the attempts to more precisely evaluate the mechanical properties of the material being tested so also has it required that the oscillograph be in an unvariable "peak-performance" condition, accordingly it is an object of this invention to provide an oscillograph of high reliability, sensitive operation and easy calibration.

It is a further object to provide an oscillograph having means for easily balancing the beam; for applying a light load at a prescribed distance from the knife edge; for moving the load carrying support to one of an infinite number of beam locations and to provide a superior easily renewable knife support surface.

It is a further object of this invention to provide an oscillograph in which means is provided for lifting the beam and loading platen knife edges from their respective supporting surfaces and also a slip clutch for the power train carrying a drum for the recording chart, said drum being readily removable from the power train output means.

These and other objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described and in a broad aspect includes a knife support in which a highly finished block of carbide or hardened tool steel is removably mounted so that the engaging surface with the knife edge is at other than the mid-point of the support surface. Further the balance beam is provided with an infinitely locatable weight support means for permitting the applied load to the test specimen to be at other than a prescribed moment arm. The chronograph chart support drum is, in this invention, now readily removable from the power train output shaft said power train being provided with a slip clutch so that the chart drum may be manually adjusted to a desired relationship of the chart and recording pen. Further the beam arm is provided with a flip-lever type weight with which to provide a small over-balance load. The improvements also include a cam-actuated lever which is adapted to lift the balance beam so as to remove its knife edge from the cooperating hardened support surface and at the same time the lever lifts the stabilizing arm so as to remove the knife edge of the arm from the support surface carried by the balance beam.

There has thus been outlined rather broadly the most important features of the present invention in order that a detailed description thereof that follows may be better understood and in order that the present contribution to the art may be better appreciated. There are, of course, additional features of the invention that will be described hereafter and which will form the subject of claims appended hereto. Those persons skilled in the art will appreciate that the conception on which the present disclosure is based may readily be utilized as the basis for designing other structures for carrying out the several purposes of this invention. It is important, therefore, that the claims be regarded as including such equivalent constructions as do not depart from the concept and scope of this invention.

A specific embodiment of the invention has been chosen for purposes of illustration and description, and is shown in the accompanying drawings, forming a part of the specification wherein.

Referring now more particularly to the drawings in which each reference character is used to indicate similar parts it is to be noted that the oscillograph comprises five main components.

(a) a base generally identified as 25 and of rigid construction and carrying a cast support pedestal 27 attached to and extending upwardly from an intermediate portion of said base;

(b) a balance beam generally identified as 30 and supported on the pedestal by a knife edge assembly;

(c) a stabilizing arm generally identified as 32 and carried by a second knife-edge assembly mounted on the balance beam;

(d) a chronograph chart drum generally identified as 34 and, for operative recording purposes, maintained in axially spaced arrangement with the base and beam; and (e) a chronograph drive train assembly and housing generally identified as 36 and mounted on the end of the base.

Referring particularly to the base and pedestal as seen in FIGS. 1, 2, 10–12 and 14, the base, as exemplified, is made of an aluminum channel 40 and end castings 41 and 42 each attached to and closing an end of the channel. Intermediate the ends of the base is mounted the pedestal 27 which includes an aluminum casting 44 attached to the channel 40 the casting having a tongue portion 45 extending through an opening provided in the channel. Attached to the top of casting 44 are two precisely spaced and aligned knife-edge support assemblies 46 which will be described in detail later in the specification. Carried by these assemblies 46 is a knife-edge 48 attached to the balance beam 30.

Figures 3, 4, 5:
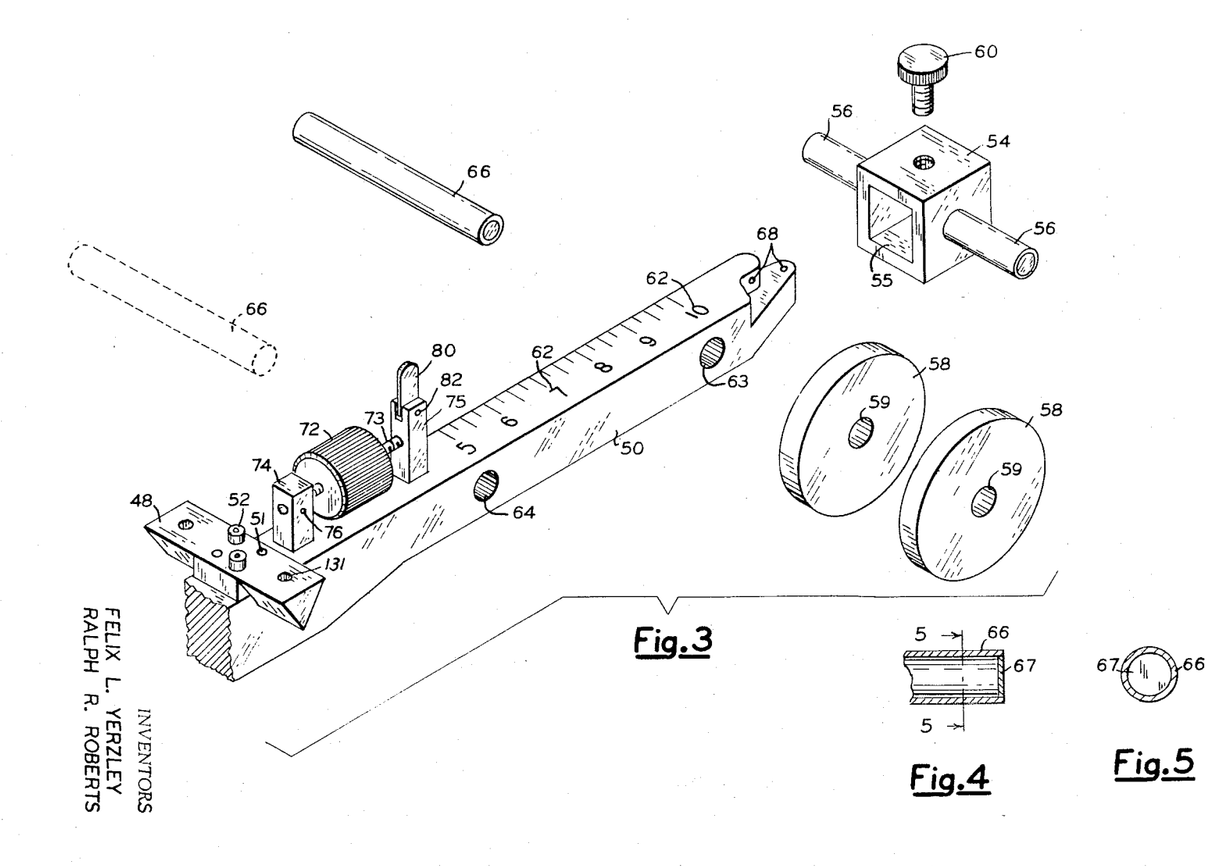
FIG. 3 represents an exploded isometric view of the balance beam with a rear portion of the beam removed.
FIG. 4 represents a fragmentary enlarged sectional view of an end portion of a weight supporting tube.
FIG. 5 represents a sectional view taken on the line 5—5 of the weight supporting tube of FIG. 4 and looking in the direction of the arrows.

As seen in FIG. 3 this beam in this embodiment is an aluminum casting 50 whose central portion is generally rectangular in shape of a size about one by one and one-half inches in cross section said beam being about twenty-three and one-half inches long. At a precise intermediate location the knife-edge 48 is attached to the top of the beam by means of such as cap screws 51 and may be further held in positive alignment with the beam by means of dowels 52. A substantial portion of the forward portion of the beam shown in FIG. 3 is shaped to provide a constant cross-section so that a slide bracket 54 having a passageway 55 is adapted to smoothly slide on this portion of constant cross section. Extending from each side of this bracket 54 is a rod 56 which in the present embodiment is made of one-half inch tubing with the exposed ends closed. The tubing providing rods of adequate strength, but of less weight, for the carrying of weights 58. These weights as used in the ASTM method of testing comprise 14 disks each weighing 1.410 pounds and 1 disk weighing .705 pound. Each disk is provided with a smooth central hole 59 which is adapted to slide on the rod 58. Bracket 54 is further provided with a tightening knob screw 60 adjustably mounted in a threaded hole 61 in the top wall of this bracket. By manipulation of the knob screw 60 the bracket 54 can be locked on the beam 50 in any position selected by the operator. When it is desired to move the bracket 54, the knob screw 60 is turned to loosen or disengage from the beam 50 and the bracket 54 may then be moved. Indicia 62 disposed to indicate a certain transversely scribed line is preferably placed on the upper surface of the beam 50 whereupon the front or rear facing edge on bracket 54 may then be selectively aligned with a predetermined mark as indicated by the indicia 62. This selection of distance being determined by the test method used.

There is formed in beam 50 a transverse hole 63 which hole is ten inches from the knife-edge of knife-edge block 48 and corresponds to the hole used in the standard oscillograph identified in ASTM D945. An additional transverse hole 64 is also provided at precisely five inches from the knife-edge of block 48, this distance being one-half the distance of hole 63. For use in the holes 63 and 64 as well as a hole 65 (FIG. 1) there are provided rods 66 which are preferably made of tubing and have end pieces 67 (FIGS. 4–5) mounted in each end thereof. The distal end of beam 30 is provided with threaded holes 68 (FIG. 3) for the attachment of a pen 70 (FIGS. 1–2) or other recording means.

Adjacent the knife-edge block 48 and before the first rod hole 64, there is provided on the top of the beam 30 an adjustable counterweight 72, which in the present instance is a knurled metallic cylinder having a threaded hole. This counterweight is carried by a threaded shaft 73 mounted in posts 74 and 75. The posts 74 and 75 are fixed to the upper surface of beam 30. In the present instance we thread post 75 to receive shaft 73 and drill post 74 to slidably retain shaft 73. A pin 76 through post 74 and shaft 73 prevents shaft 73 from turning. It is to be noted that the threaded passageway in counterweight 72 is made a friction fit with shaft 73 or may have friction provided in the way of a plastic plug insert of conventional design.

In the use of the counterweight 72 the beam 30 is balanced by manipulating said counterweight so that the tip of the pen is horizontal. In the actual test method the pen 70 is to be made approximately thirteen percent or six and one-half small squares below the horizontal on the chronograph paper chart 78. This corresponds to the test method twenty percent deflection line. As noted in the test procedure (Note 2) "the beam shall be kept slightly over-balanced (with the balance beam at rest, pen should stop approximately 16 small squares (32 percent) below zero line)" so that a positive load is applied to the test specimen when all weights are removed. An easily applied over-balancing weight is provided in this invention by the use of a flip-arm 80 which when used exerts approximately one-half ounce additional load.

In FIGS. 1, 3, 6 and 15 is shown this positive means of applying a small over-balancing weight. Post 75 is made with an extended upper portion which has a centrally disposed slot 81 of predetermined depth. Pivotally retained in this slot by pin 82 is the flip-arm 80 which has its inner mounted end shaped so that the arm will rest in a nearly vertical position at about five to ten degrees past the vertical and toward the knife-edge block 48. This end of the arm is rounded so that it may be swung forwardly in an arc so as to lie substantially parallel to the beam 50. The arm 80 is made of a size and weight so that the shift of center of gravity by the movement of arm 80 from the two limits of movement will provide the load to move the beam downwardly an amount sufficient to provide the difference between the thirteen and thirty-two percent positive load required for the test.

Figure 6:
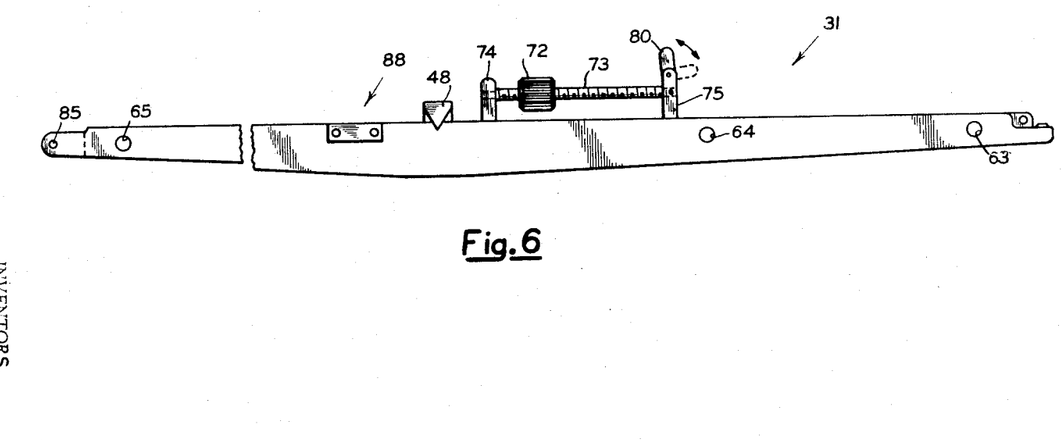
FIG. 6 represents a side view of an alternate balance beam construction.
Figure 7:
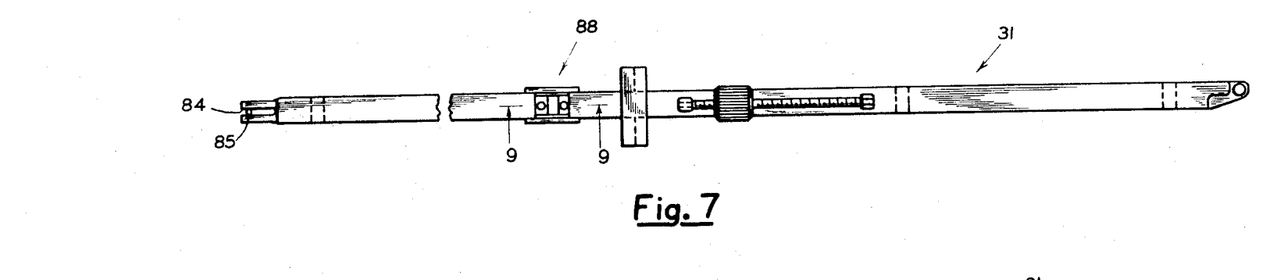
FIG. 7 represents a top view of the balance beam of FIG. 6.

Referring now to FIGS. 6 and 7 there is shown an alternate balance beam identified as 31. This beam is in all respects similar to the beam 30 of FIGS. 1, 2 and 3 except that no provision has been made for the mounting and sliding on the forward part of this beam 31 of a bracket such as the slide bracket 54. Beam 31 is tapered toward both ends and has the rod holes 63, 64 and 65 spaced and used as in beam 30. It is to be further noted that the FIGS. 6 and 7 show the rear part of the beam 31 which is the same as beam 30 and which showing of the rear part of the beam is not in FIG. 3. This rear portion of the beams include a clevis end which has a slot 84 and a transverse pin 85 extending through the side walls and the slot. This clevis is adapted to engage a spring-loaded hook 86 and by this hook to be locked in the load testing position outlined in the ASTM (D945) test procedure.

Figures 8, 9:
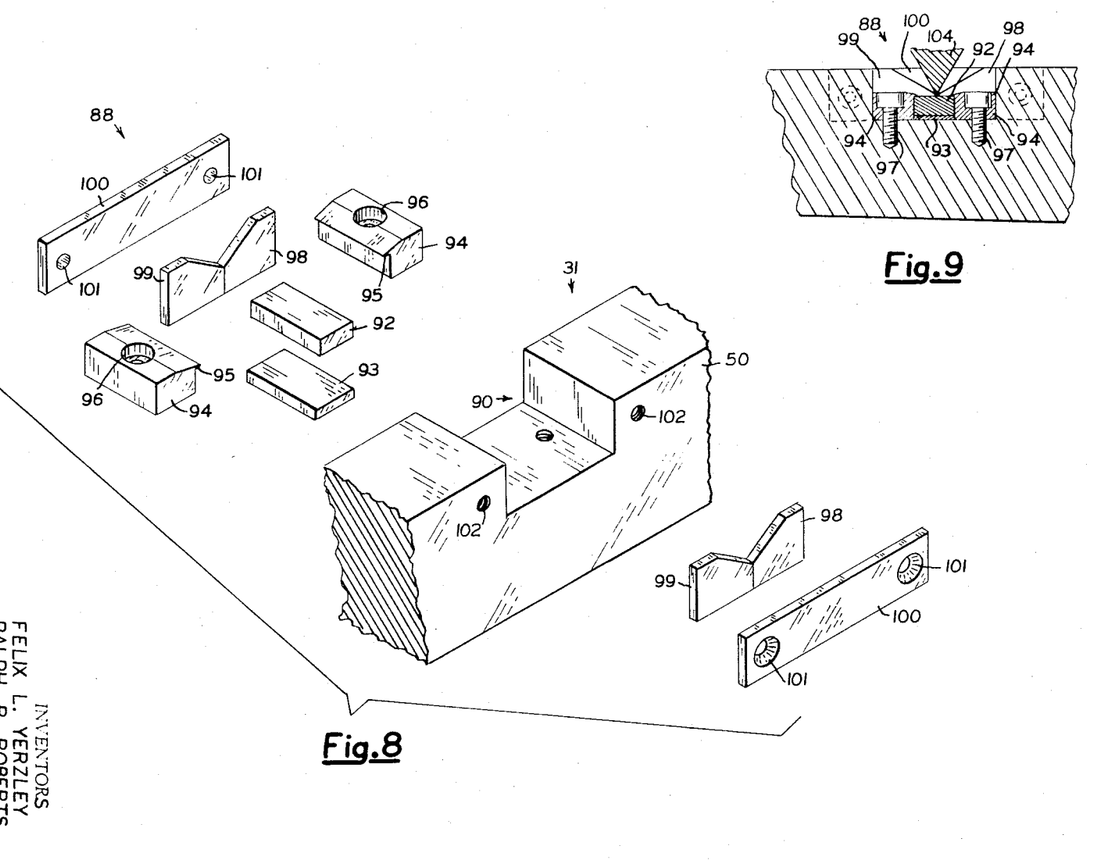
FIG. 8 represents an exploded isometric view of the components comprising the knife-edge support assembly provided in the balance beam for supporting the knife-edge of the stabilizing arm.
FIG. 9 represents a fragmentary sectional view of the knife-edge support of FIG. 8 and taken on the line 9—9 of FIG. 7.

Intermediate the clevis end and knife-edge block 48 there is provided in the beam a knife-edge support assembly 88 adapted to receive stabilizing arm 32 which, in this embodiment, is constructed so as to produce a precise spacing of the stabilizing arm 32 and the knife-edge 48. This spacing is in the present instance one and sixty hundredths inches. In FIGS. 8 and 9 is shown the means of providing a superior renewable knife-edge support. In beam 31 there is formed a transverse slot 90 of a predetermined depth. A carbide or hardened tool steel blank having a hardness in excess of Rockwell "C" sixty is ground to produce a rectangular member 92 whose upper and lower surface is preferably finished to provide a true flat surface equivalent to a four to six micro-finish (RMS micro-inches). A filler block 93 of the same width and length is made of a suitable thickness to combine with the preselected thickness of the rectangular member 92 to provide a surface a precise distance below the top surface of the beam. Filler block 93 need not be hardened but is in the present embodiment made of a stabilized steel such as bar-hardened SAE 4140 steel of about twenty-eight to thirty Rockwell "C." A pair of clamp blocks 94 having shoulder engaging lips 95, have shouldered mounting holes 96 formed intermediate their ends and sides. The clamp blocks are a few thousandths of an inch less in height from their base to the lip 95 than is the combined thickness of member 92 and block 93. Small cap screws 97 are mounted in holes 96 and are threaded into and tightened in appropriately spaced and tapped holes in beam 31. Each end of the slot 90 is closed by a pair of knife-edge guide retainers. These retainers are of hardened tool steel of at least sixty Rockwell "C" and are similar but not identical. As seen in FIG. 8 the right retainer member 98 is made about three-sixty-fourths of an inch shorter than the left retainer member 99. The thirty degree sloped portion of upper edges of each of the blocks are formed so that at the point of juncture of the two slopes and at this same line of juncture of retainer members 98 and 99 the bottom of the formed shallow V will be at the precise height as the combined heights of the member 92 and filler block 93. End clamp plates 100 are shown as of rectangular shape and having chamfered holes 101. These clamp plates are attached to the cast beam 50 by means of flat head screws (not shown) the screws threaded into tapped holes 102. The width of the beam casting 50 is made slightly less than the length of member 92 and the combined thicknesses of the two pairs of retainers 98 and 99.

Assembly of the components comprising the knife-edge support block assembly 88 into the slot 90 is simply and precisely made as follows: member 92 and block 93 are placed in central portion of the slot 90 and clamp blocks 94 are placed in the sides of the slot with the clamp cap screws 97 threaded into the appropriately tapped holes in the bottom surface of the slot 90. Right and left retainers 98 and 99 arranged as shown in FIG. 9 are placed at each end of the slot 90 and then clamp plates 100 are brought to the sides of the slot and are brought toward the beam surface by means of the flat head screws mounted in the tapped holes 102. Right and left retainers 98 and 99 are seated with their bottom edges firmly against the bottom of the slot 90. Clamp blocks 94 are then brought snugly into clamp position by tightening cap screws 97. The clamp plates 100 are then brought snugly against the retainers 98 and 99 to clamp them in position. It is to be noted in FIG. 9 that a knife-edge block 104 forming a part of the stabilizing arm 32, rests on the carbide member 92. The retaining members 98 and 99 being of different lengths are assembled so that the knife-edge of block 104 is about three-sixty-fourths inch from the longitudinal center line of member 92. When wear or any other factors cause the surface of this member 92 that is disposed under the knife-edge to lose its precision finish the assembly 88 is disassembled by reversing the procedure described above and the member 92 is repositioned. Four surfaces are available for use under the knife edge, viz: the member 92 may be turned end-for-end providing one new surface, and then the member may be turned over to provide two further surfaces.

Figures 10, 11:
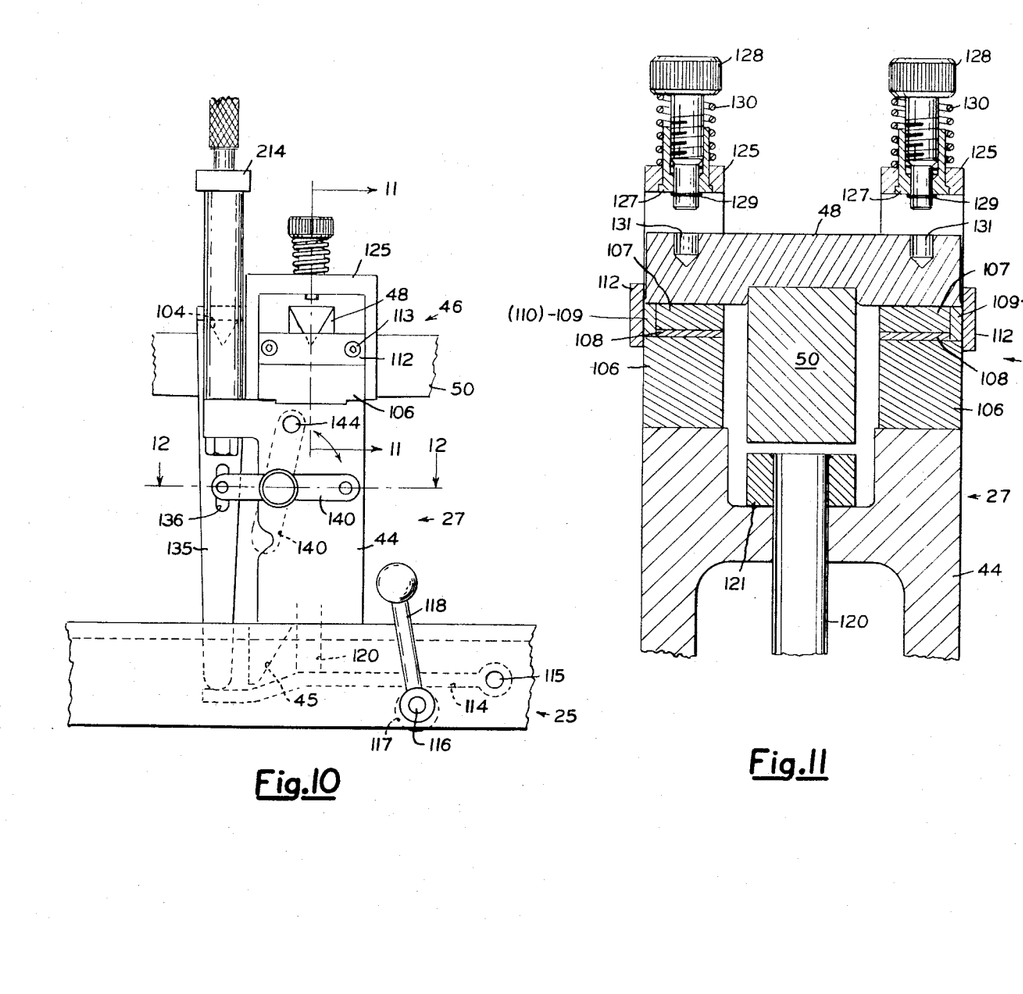
FIG. 10 represents a fragmentary side view of the base, pedestal, lifting means for the stabilizing arm and for the balance beam and showing alignment means.
FIG. 11 represents a sectional view taken on the line 11—11 of FIG. 10.

Referring now to FIGS. 10 and 11 and the knife-edge support assemblies 46, a support block 106 having a dove-tailed bottom surface adapted to engage the machined upper surface of the pedestal casting 44 which may be fastened to this casting by means of cap screws (not shown). On these blocks are mounted the components forming the assembly 46. A carbide member 107 rectangularly shaped as is member 92 in FIG. 8 is preferably made of tungsten carbide with the upper and lower surfaces finished in the manner of member 92, however member 107 may be made from tool steel hardened to a hardness in excess of sixty on the Rockwell "C" scale. Member 107 rests on a filler block 108 which may be made of unhardened steel or other metal but is preferably made of a stabilized steel such as SAE 4140 in the bar hardened condition of twenty-eight to thirty Rockwell "C." This filler block is precisely finished as to thickness similar to block 93 of FIG. 8 described above. An end retainer assembly comprising a right and left retainer member 109–110 each similar to the members 98 and 99 of assembly 88 is mounted at the outer end of the block member. End clamp plates 112, attached to blocks 106 by means of flat head screws 113, provide end walls to retain the members 109 and 110. It is to be noted that plates 112 also provide end stops to restrict lateral movement of knife-edge block 48. Block 48 is made a few thousandths of an inch less in length than the inside distance between plates 112. It is to be noted that both knife-edge block 48 (FIG. 11) and knife-edge block 104 after being formed to a predetermined length have these ends relieved leaving said predetermined length on about the one-sixteenth inch of block adjacent the knife-edge. This relief provides that during oscillation the end friction of the knife-edge blocks 48 and 104 with the respective adjacent end clamp plates will produce a minimum frictional reaction.

Figures 13, 15:
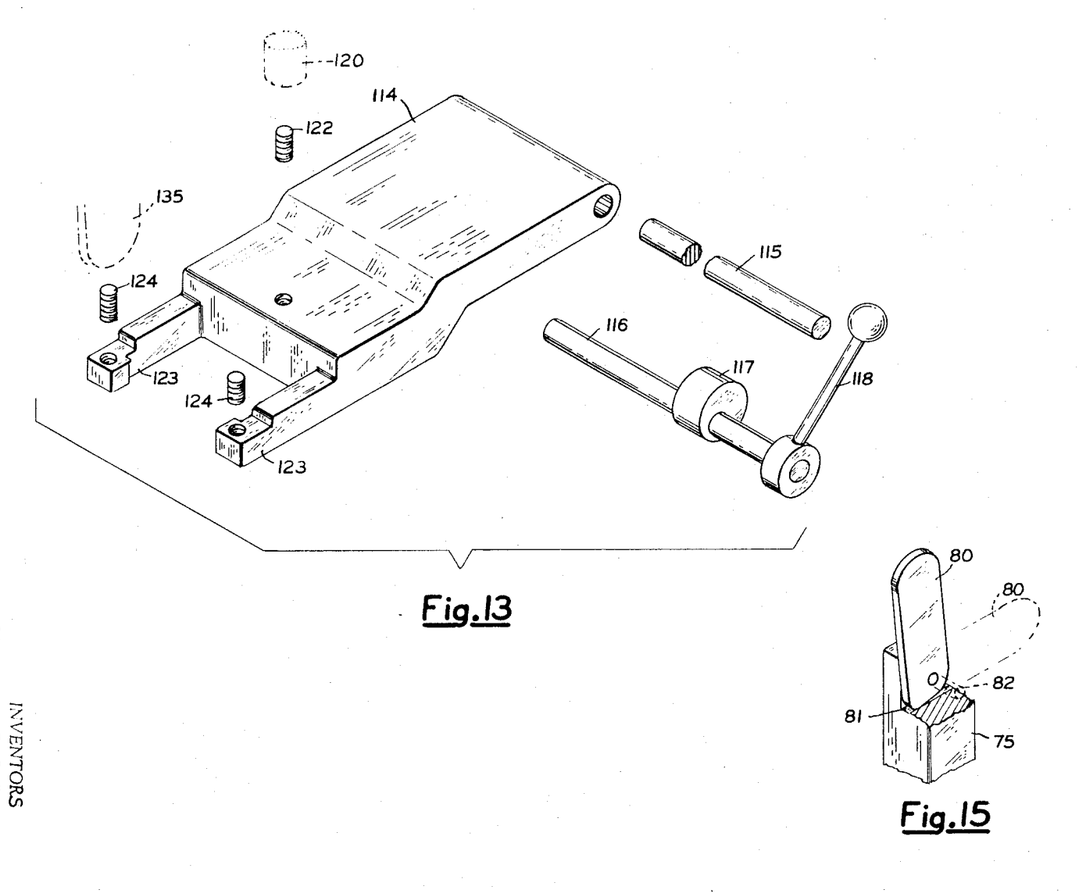
FIG. 13 represents an exploded isometric view of the lifting mechanism used for the balance beam and stabilizing arm.
FIG. 15 represents a fragmentary isometric view of the flip-lever weight provided on the balance beam.

Means are provided for lifting the balance beam 30 so that the knife-edge of block 48 is positively removed from contact with carbide members 107. Accordingly, as shown in FIGS. 10, 11 and 13, a lift beam 114 is pivotally supported at one end by a shaft 115 carried in aligned holes in the sides of channel 40. Also carried in channel 40 and at a short distance toward the pedestal 44 is a cam shaft 116. This cam shaft 116 carries a fixed circular cam 117 adapted to engage the underside of the lift beam 114. To impart rotation to cam shaft 116 there is provided a throw lever 118 which is fixedly mounted on one end of the shaft 116. Stop means not shown may be provided to limit the movement of lever 118.

Disposed to slide up-and-down in an approximately formed guideway in pedestal 44 is a lift plunger 120. The lower end of the plunger rests on beam 114 while the upper end of the plunger has a support block 121 attached. This block 121 is adapted to engage the underside of beam 50 while at the same time providing a shoulder to limit the downward movement of the plunger. Means to adjust the distance between the end of plunger 120 and lift beam 114 is provided by an adjusting screw 122 carried in a threaded hole in beam 114. The beam 114 also has two extended portions 123 each carrying an adjusting screw 124 for a purpose to be described below.

Referring now to FIGS. 10 and 11, it is to be noted that block 106 has mounted thereon a bridge support 125 of a generally U-shape which is attached in an inverted position. Mounted in each support 125 is a threaded bushing 127 carrying a threaded thumb screw 128 whose one end is knurled for finger manipulation and whose other end is reduced in diameter to provide a rounded dowel portion. A snap ring 129 is mounted in an appropriately formed groove in the dowel portion so as to limit the upward movement of the thumb screw 128. A compression spring 130 is provided to urge each of the screws outward. In use when it is desired to lift the knife-edge of block 48 of beam 50, the screws 128 are pushed toward block 48 and by manipulation of the thumb screw 128 is caused the thread of the screw to engage the thread of bushing 127 and by continuing the turning of the screw 128 the dowel end is brought to and into reamed holes 131 in the block 48. Lever 118 is then moved to cause cam 117 to rotate and thereby to lift beam 114 which in turn lifts plunger 120. As plunger 120 moves upwardly it engages the bottom of beam 50 and moves it upwardly until the lift action of cam 117 is completed. The dowel ends of screws 128 engaging reamed holes 131 in block 48 as beam 50 is lifted insures that beam 50 is maintained in a precise location. When the beam 50 is to be lowered to the member 107 the throw lever 118 is moved back to its operating position; the dowel end portions of screws 128 guiding the beam and the knife edge of block 48 into precise engagement of the lower most portion of the V between retainers 109 and 110. Screw 128 is then turned to move outwardly until the thread of the screw 128 leaves the thread of bushing 127 whence the spring 130 urges the screw 128 outwardly until the snap ring 129 restricts further outward movement. The dowel ends of screws 128 disengaging from holes 131 whereby the beam 50 is once more in test operating condition.

Referring to FIGS. 10, 12, 13 and 14 it is noted that it is also necessary to lift stabilizing arm 32 as beam 50 is moved upwardly. Accordingly, side plates 135 are provided with slots 136, said slots providing a guideway whose center line is at least parallel to a line extending from the knife-edge of block 104 to the center of the guide rollers 138 (FIG. 14) disposed on the lower portion of arms 135. Mounted on each side of pedestal 44 is a guide arm 140 having a dowel 141 attached on one end thereof, the dowel 141 being in a snug slide fit slot 136. On the other end of the arm 140 is a stabilizing pin 142 adapted to seat in and be retained in a reamed hole 143 and in a drilled hole 144. Intermediate the ends of the guide arm 140 and fixedly attached to the arm and carrying said arm is pivot rod 145 which is rotatably and slidably carried in a reamed hole in pedestal 44. On the outer or exposed side of the arm 140 the extended portion of the rod has mounted thereon a knob 146 while on the inner end of the rod is provided a washer or cotter pin 147 adapted to engage and retain one end of a compression spring 148 which is carried by the rod.

The operation of the guide mechanism for the stabilizing arm 32 is as follows: prior to the operation of lever 118 to lift beam 50 each of the knobs 146 is grasped and pulled outwardly so that stabilizing pin 142 is removed from drilled hole 144 in pedestal 44. The guide arm 140 is then rotated from the position shown in dotted outline FIG. 10 to the position shown in solid outline. Pin 142 enters reamed hole 143 and guide dowel 141 is entered into slot 136. Lever 118 may then be moved to actuate cam 117 and adjusting screws 124 carried in beam 114 and adapted and adjusted to engage the bottom portion of side plates 135 engage and lift the stabilizing arm 32. The knife-edge block 104 as it moves upwardly is vertically guided and retained by rollers 138 carried on the lower end of arms 135, said rollers being retained in a guideway to be later more fully described. The slot 136 formed midway in each of the arms 135 is slidably engaged by each of the now fixed-in-space pins 141 so that the stabilizing arm 32 is suspended and supported in a vertical position. It is to be noted that beam 114 is preferably mounted in channel 40 in such a manner that as cam 117 is moved the extended portions 123 of beam 114 moves through a greater vertical distance than the vertical distance for lift plunger 120. The adjusting screws 124 are adjusted so that side plates 135 are contacted prior to the engagement of screw 122 with plunger 120. In this manner, stabilizing arm 32 is the first to disengage its knife-edge and when cam 117 is rotated to operating position the knife-edge of block 104 engages member 92 subsequent to the seating and engagement of the knife-edge of block 48 and members 107.

Figures 12, 14:
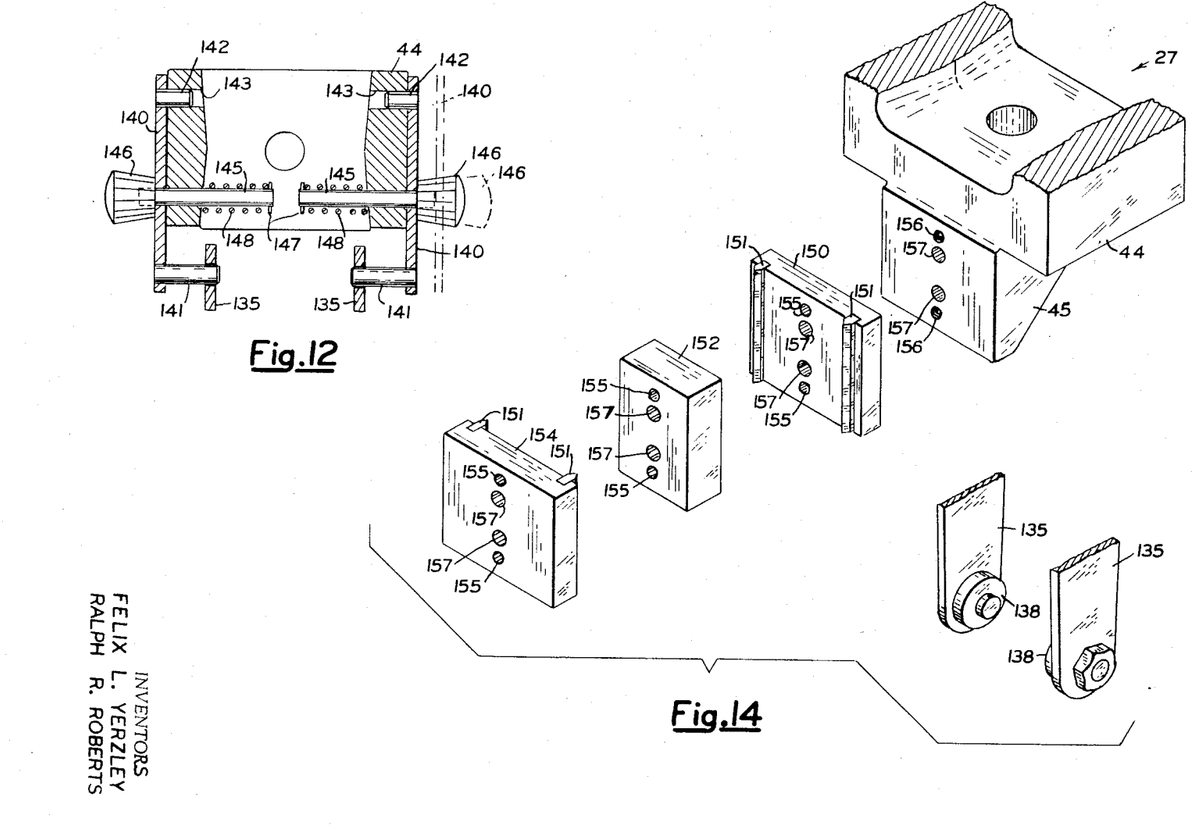
FIG. 12 represents a sectional view taken on the line 12—12 of FIG. 10.
FIG. 14 represents an exploded isometric view of the roller guide ways provided for the rollers of the stabilizing arm.

It is to be noted that the test method of ASTM D945 requires that the stabilizing arm shall be maintained so as to provide parallelism of the loading platens. The stabilizing arm 32 in the present embodiment is a modification of a like arm shown in the ASTM D945 test method in that newly formed slots 136 are provided in the side plates 135. As in the prior arm the lower end of the arms are provided with guide rollers 138 as in the arm of ASTM D945. These rollers are preferably a high quality ball bearing about three-eighths of an inch in diameter. In the requirement for a test apparatus more sensitive than the test method of ASTM D945 it is desirable to reduce the rolling friction developed between the rollers 138 and the guideways defining the roller pathway. Therefore a guideway improved from the guideway of ASTM D945 is shown in FIG. 14 in which the contacting surface is reduced to a bare minimal line contact. The improved guideway of the preferred embodiment shown has extending downwardly from pedestal 44 and as a part of the same casting a tongue 45 having its forward face precisely finished. A rear guide block 150, having a length and width similar to the finished face of tongue 45, has a pair of precisely spaced hardened rail inserts 151. These inserts have their longitudinal exterior front face formed into a V and as reduced to practice the V is about a sixty degree included angle with the apex of the V being rounded a few thousandths. The apexes of both V's lie in the same plane and are parallel to the machined surface of tongue 45. A spacer block 152 of precise thickness and of the same length and lesser width than guide block 150 is disposed to be mounted between rear guide block 150 and a front guide block 154. Front guide block 154 is identical to guide block 150 and has similarly formed and used rail inserts 151. This block 154 is rotated one hundred eighty degrees from the position of block 150 so that the rails 151 in each block 150 and 154 will be disposed opposite each other. To assemble, cap screws, not shown, are inserted in holes 155 and threaded into holes 156 in tongue 45. Precision dowels, not shown, are inserted into holes 157 in members 154, 152, 150 and tongue 45 and provide a precise alignment of these assembled components. The cap screws are then tightened into holes 156. The resulting guideway between opposed inserts 151 provide substantially a line contact of rail 151 to roller 138 and reduce substantially the effect of dust. It has been found desirable to make spacer block 152 slightly thinner than is initially required and to make up this difference by the use of a laminated shim having several laminates of about two thousandths of an inch per laminate. As wear eventually develops on the combined apex edges of rails 151 the block 154 is removed, a single laminate is removed and block 154 is tightened back in position. As wear continues, four or five or more laminates can be removed without affecting the practical parallelism of the platens. If more than ten laminates are to be removed it may be desirable to place a laminate or two between block 150 and tongue 45.

Figure 1:
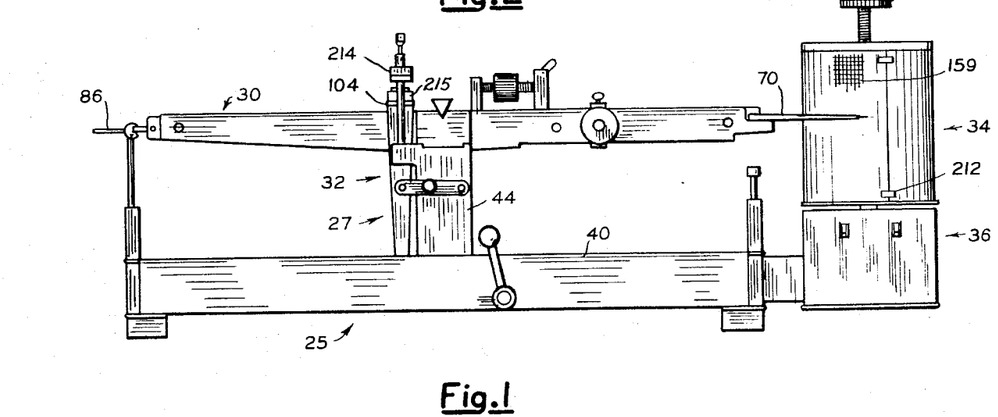
FIG. 1 represents a side view of the oscillograph showing a general arrangement of parts and one embodiment of balance beam.
Figure 2:
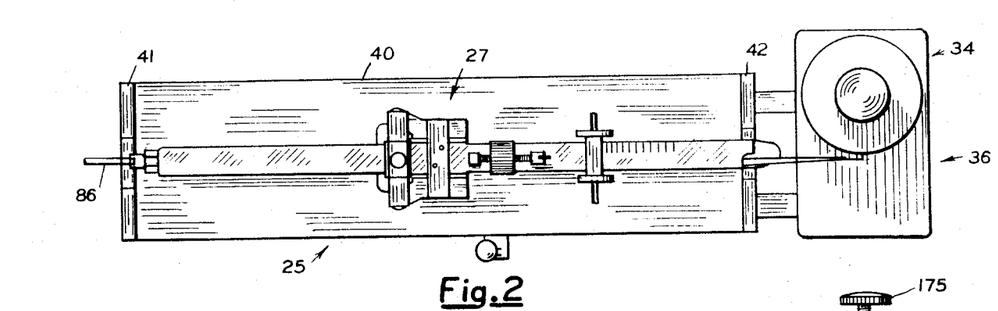
FIG. 2 represents a top view of the oscillograph of FIG. 1.

Reference is now made to FIGS. 16–19 and the chronograph drum 34 as seen in use position in FIGS. 1 and 2. The drum, as provided in the oscillograph test equipment as heretofore used, has been top supported which has been an inconvenience to the user. Our new chronograph drum has no top support and additionally is readily removable and height adjustable. Our chronograph drum 34, as exemplified, is made with a tubular sleeve 160 having a lower skirt or lip 161 providing a lower edge support for a paper chart 159 as fragmentarily seen in FIG. 1. A top end member 162 is pressed into the sleeve and may be pinned or braced in position. Centrally disposed in top end 162 is a threaded bushing 163 which is pressed in place and is formed with a smooth bore portion and a top reduced threaded portion. A lower end plate 164 is pressed into sleeve 160 and may be fastened in the manner of member 162. Centrally disposed in the plate is a flanged bearing 165 which in the present instance is an oil-impregnated porous bronze bearing. Equally spaced on each side of the center line of the bore of the bearing 165 are shoulder blocks 166. These blocks are precisely spaced so that their facing surfaces are parallel and are at a preselected distance from the common center line of the bore of bearing 165 and bore of bushing 163. Mounted in the shell and ends 162 and 164 are one or more ceramic magnets 168 said magnets having their outer ends at or just below the surface of the drum sleeve 160. A shaft 170 is adapted to carry the drum 34 and as said shaft is revolved the drum will likewise revolve without relative play or wobble. Accordingly shaft 170 is made with a diameter portion 171 adapted to snugly slide in and be seated in bearing 165. The upper portion of diameter portion 171 is machined to provide flats 172 disposed to be parallel and at an equal distance from the shaft center line. These flats 172 are adapted to precisely slide between and engage shoulder blocks 166. Reduced diameter 173 is formed to slidably enter and be retained by the smooth bore portion of bushing 163. A shoulder portion 174 is formed adjacent the lower diameter portion 171 and engages the flange portion of bushing 165 when the drum is in its lowest position.

Figures 16, 17:
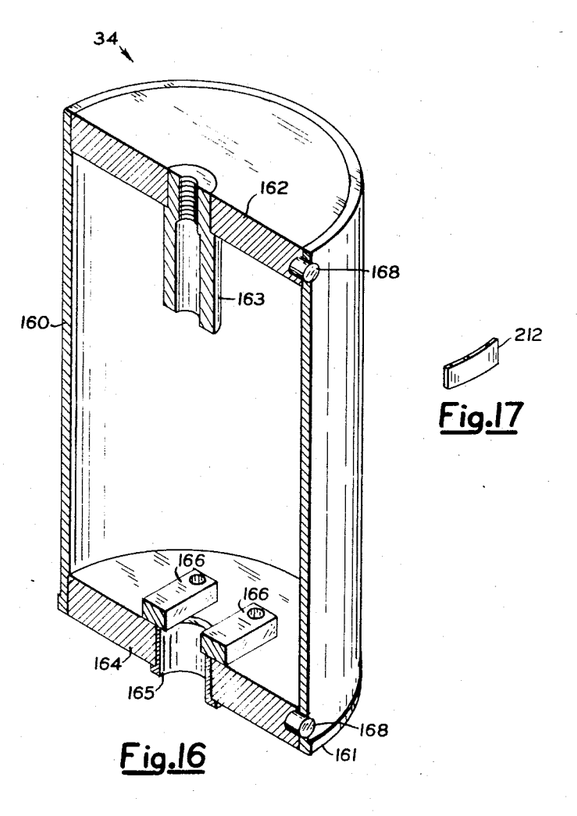
FIG. 16 represents a sectional isometric view of the removable chronograph drum.
FIG. 17 represents an isometric view of a curved metallic paper retainer.
Figure 18:
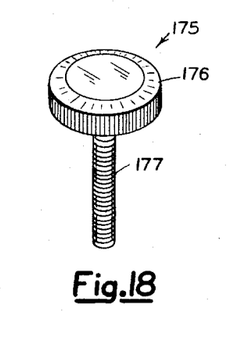
FIG. 18 represents an isometric view of an adjusting knob used on the chronograph drum.
Figure 19:
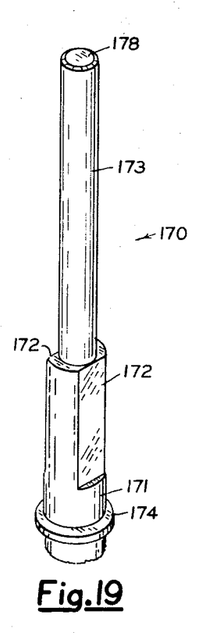
FIG. 19 represents a fragmentary isometric view of the upper portion of the drive shaft carrying the removable chronograph drum.

A knob screw 175 having a knob portion 176 and a threaded rod portion 177 is threadedly mounted in the thread portion of bushing 163. The lower end of the rod portion 177 extending into the smooth bore portion of bushing 163 and engaging the upper end 178 of the shaft 170. By turning the rod portion 177 into the bore portion of bushing 163 the screw 175 will cause the drum 34 to be raised from shoulder 174 and supported on the end 178. In this manner the drum may be adjusted to any desired height.

Figure 20:
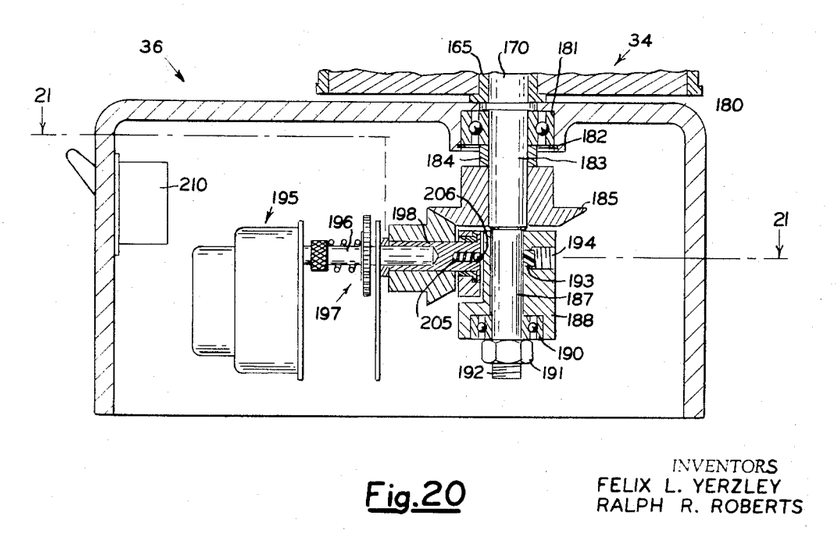
FIG. 20 represents a sectional side view of the power train drive of the chronograph taken on a line 20—20 of FIG. 21.
Figure 21:
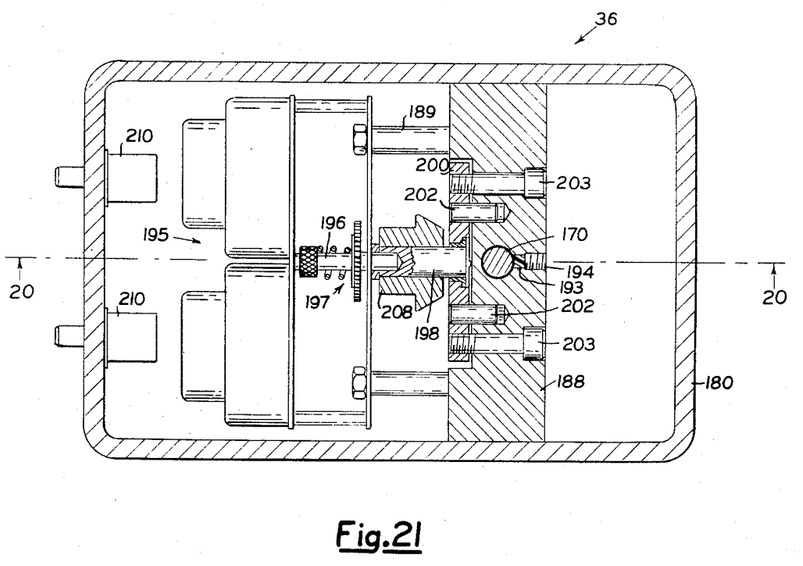
FIG. 21 represents a sectional top view of the chronograph drive and taken on the line 21—21 of FIG. 20.

Referring now to the power train shown in FIGS. 20 and 21, the drive train assembly 36 is conventionally housed in a casting 180 having a bearing 181 mounted in a shouldered bore in a boss portion of the casting. A snap ring 182, as exemplified, retains the bearing longitudinally in the bore. Shaft portion 183 is shown as the same size as shaft diameter 171 and in addition to bearing 181, carries a spacer 184 and a bevel gear 185. Shaft 170 is then reduced in diameter to a diameter 187. A bearing block 188, extending from both side walls of the casting 180 and by screws, not shown, mounted therein, has a shaft bore therethrough, said bore being a non-engaging bore of at least one-sixty-fourth larger diameter than shaft portion 187. Carried in a bearing bore formed in block 188 is a lower support bearing 190. This bearing 190 is a light press fit in block 188 and by means of a nut 191 threaded onto a lower thread portion 192 of shaft 170 is retained in the bearing bore. There is additionally provided a means for preventing rotational movement of the shaft similar to a shake. A light snub or frictional retarding device is provided by means of a small nylon or similar plastic plug 193 in a transverse bore and urged into position by means of a screw 194 mounted in a threaded hole. A two-speed motor reducer as for example made by Bristol Motors, Old Saybrook, Conn. and identified as 195 is carried by screws and spacers 189 extending from bearing block 188. The output shaft 196 of this dual motor is provided with a spring clutch 197 made adjustable by means of a spring bias and nut. The outboard portion of shaft 196 carries a shouldered shaft 198 the rear portion engaging shaft 196, the forward shouldered portion being carried in a flanged oil-impregnated porous bronze bearing 199. Bearing 199 is mounted in a movable block 200, maintained in alignment by dowels 202 and movable by means of cap screws 203. Dowels 202 as exemplified are a press fit in block 200 and a sliding fit in block 188. Urging shaft 198 toward the motor is a compression spring 205 carried in a forward bore of the shaft 198, the spring on its outer end engaging a ball 206 which contacts block 188. Fixed to shaft 198 is bevel pinion 208 which engages and drives bevel gear 185.

In use it is desirable that pinion 208 engage gear 185 in a manner to keep the back lash at a minimum. Accordingly cap screws 203 are rotated to forwardly move block 200 and shouldered shaft 198 with pinion 208 thereon and thereby to move pinion 208 into the desired engagement with gear 185. Spring 205 provides the bias to keep shaft 198 seated in block 200 and to not move forward unless moved there by block 200. The spring clutch 197 permits the mounted drum 34 to be rotated either clockwise or counter-clockwise as desired by the operator, the clutch permitting shaft 170, gear 185, pinion 208 and shaft 196 to be rotated without affecting the output shaft disposition of either motor. Toggle switches 210 are shown as disposed for easy manipulation to control the electrical operation of the motors in gear motor 195.

Of further note is the metallic clip 212 (FIG. 17) which is attracted by magnets 168. In use a chronograph chart is placed on the drum 34 and with the ends of the chart lapped a curved clip 212 is placed on the paper over each of the magnets 168. The magnets maintain the clips 212 against the drum surface and in this manner the chart is maintained against the drum.

*Use and operation*

In use the improved oscillograph of this invention provides a cast beam 30 or 31 which being of tapered construction and preferably of aluminum reduces the moment of inertia of the standard components. When a test specimen 215 to be tested is placed on the loading platen represented by the knife-edge block 104 of the stabilizing arm and a micrometer advanced upper platen represented as 214, the load applied as per test procedure in ASTM method D945 is provided by the weights 58 which are mounted on a rod 66. The reduced moment of inertia of the beam 30 and 31 will produce a truer test of the weight force applied to the test sample. When the weights are moved inwardly to selected intermediate positions the load applied at the shorter lever ratio will produce a more sensitive analysis of the test. The flip arm 80, as now constituted, provides a positive load of constant proportion to the beam loading.

Above has been detailed the advantages provided by superior renewable support surfaces and a lifting means to enable the knife edges to be safely and positively lifted from the cooperating support surface and to be precisely returned to this surface when lowered for operation. The removable chronograph drum, magnetic clip means, and slip clutch provides an easy means of mounting of the chronograph paper and adjusting the drum for the conducting of the test.

The terms "up," "down," "in," "out," "left," "right" and similar terms are applicable to the apparatus as described in conjunction with the accompanying drawing and it is to be noted that such terms are merely for the purpose of description and do not necessarily apply to a position in which the apparatus may be constructed or used.

While we have herein shown and described our invention in what we have conceived to be the most practical and preferred embodiment and modification, it is recognized that departures may be made therefrom within the scope of our invention, which is not to be limited to the details disclosed herein but is to be accorded the full scope of the claims so as to embrace any and all equivalent devices.

Having described our invention herein, what we claim as new and desire to secure by Letters Patent is:

1. A mechanical oscillograph for the measuring of the mechanical properties of elastomeric vulcanizates and the like comprising: (1) a base; (2) a chronograph drum drive assembly disposed in fixed relationship to the base; (3) a chronograph drum carried by the drum drive assembly; (4) a pedestal carried by the base; (5) a balance beam having a knife edge which rests on and is supported by the pedestal, the beam being able to oscillate in respect to the base, and the beam carrying on its one end a recording means adapted to be moved toward and to engage the chronograph drum; (6) means to support a plurality of standard weights at more than one location on the balance beam said locations being between the recording end and the knife edge; (7) a counterweight carried by a threaded rod, the rod fixedly mounted on the balance beam so that as the counterweight is rotated it will move toward or away from the knife edge to provide the desired balance of the balance beam; (8) a flip-arm mounted on the balance beam and adapted to be rotated from a non-load to a load position to shift the center of gravity of the beam and attached components to provide a slight over-balance of the beam end having the recording means; (9) a stabilizing arm carried by the balance beam at a precisely pre-determined point thereon, the stabilizing arm adapted to support a test specimen for the test thereon and (10) an upper test loading surface carried by the base and adjustable to provide a determined compression on the test specimen.

2. A mechanical oscillograph as in claim 1 in which the beam is diminished in cross-sectional area as the beam approaches its extremities, the diminishing reducing the unit weight per increment of length so as to reduce the moment of inertia to increase the natural frequency of oscillation of the balance arm.

3. A mechanical oscillograph as in claim 1 in which the means to support a plurality of standard weights includes a slide bracket movably mounted on the balance beam and adapted to be removably clamped thereon at an infinite number of locations between the knife-edge and the end carrying the recording means, the bracket having outwardly extending rods disposed at right angles to the axis of the beam when the bracket is clamped on the beam, each rod adapted to accept and retain at least one standard weight, the changing of location of the weights in respect to the knife edge altering the moment of inertia of the balance beam and the natural frequency thereof.

4. A mechanical oscillograph for the measuring of the mechanical properties of elastomeric vulcanizates and the like comprising: (1) a base; (2) a chronograph drum drive assembly disposed in fixed relationship to the base; (3) a chronograph drum rotatably carried by the drum drive assembly; (4) a pedestal carried by the base and having a pair of knife-edge support assemblies; (5) a balance beam having a knife-edge resting on and retained by the pedestal knife-edge support assemblies, the beam so mounted being able to oscillate in respect to the base and carrying on its one end a recording means adapted to be moved toward and to engage the chronograph drum; (6) means to support a plurality of standard weights at more than one location on the balance beam said locations being intermediate the recording end and the knife-edge; (7) a counterweight carried by a threaded rod, the rod fixedly mounted on the balance beam so that as the counterweight is rotated it will move toward or away from the knife edge to provide the desired balance of the balance beam; (8) a flip arm mounted on the balance beam and adapted to be rotated from a non-load to a load position to shift the center of gravity of the beam and attached components to provide a slight over-balance of the beam end having the recording means; and (9) a stabilizing arm including a knife edge block having downwardly directed a knife-edge adapted to engage and be carried by a stabilizing arm downwardly directed knife-edge support assembly removably mounted in the balance beam at a stabilizing arm precisely selected point on the balance beam, said knife-edge support assembly including a hardened support block having a finished face adapted to engage and support the knife-edge of the stabilizing arm; a recess in the balance beam and formed to engage and support the hardened support block at a precise distance from the knife-edge of the balance beam; clamp means adapted to engage and hold the hardened support block in the predisposed position; a knife-edge end-retaining member adapted to lie adjacent each end of the stabilizing arm support block to provide a V-guide whose low point is in precisely the same plane as the support surface of said stabilizing arm support block; and an end clamp plate adjacent each end retaining member and removably mounted to the beam so as to clamp the end retaining members in place and to provide end stops for the stabilizing arm, the knife-edge block of the retaining arm providing a movable platen for the test specimen; and (10) an adjustable upper platen fastened to the pedestal and providing means to engage and hold the specimen being tested.

5. A mechanical oscillograph as in claim 4 in which the pair of knife-edge support assemblies on the pedestal each include a hardened beam support block each having a finished face adapted to engage and support one of the outer portions of the knife-edge of the balance beam; means to support each support block so that the support surface lies in a precise plane; clamp means adapted to engage and hold the hardened support block in the precise plane; beam knife-edge end retaining members adapted to lie adjacent an outer end of each beam support block to provide a V-guide whose low point is in the precise plane of the support surface of the support block; and an end clamp plate adjacent each end retaining member and removably mounted to the pedestal to provide a clamp for urging the end retaining members in place and to provide end stops for the knife-edge block of the balance beam.

6. A mechanical oscillograph as in claim 5 in which the end retaining members of the stabilizing arm knife-edge support provided in the balance beam are disposed so that the low point of the V-guide is located a short distance from the center line of the stabilizing arm hardened support blocks.

7. A mechanical oscillograph as in claim 6 in which the stabilizing arm is provided with a pair of side plates attached to and extending downwardly from the stabilizing arm support block and in which there is provided an inwardly disposed roller mounted on the lower end of each side plate of the stabilizing arm and a roller guideway provided in the support base and including front and rear guide blocks each having hardened rail inserts formed and mounted in the guide blocks so as to present a minimal area engaging surface to the rollers, said engaging surface being the apex of a V-shaped edge and a tongue portion on the pedestal casting providing means for mounting said front and rear guide blocks thereon, said blocks being spaced and mounted so as to present the engaging surfaces of the rail inserts in a parallel and spaced relationship to provide parallel guide paths of predetermined clearance.

8. A mechanical oscillograph as in claim 4 in which there are provided means to lift and support the balanced beam and the stabilizing arm so that their knife-edges are moved to a predisposed position above the cooperating knife-edge support surfaces.

9. A mechanical oscillograph as in claim 8 in which the means to lift the balance beam and stabilizing arm includes: (1) a lift beam hingedly mounted on one end to the base; (2) a lift cam adapted to engage the lift beam intermediate its ends and to support and lift this beam from an operative position to a lift position; (3) a lift plunger carried in the pedestal and adapted to engage the lift beam and by the movement of the lift beam to be urged into engagement with the balance beam so as to lift the balance beam; (4) finger portions provided on said lift beam each finger portion adapted to engage a bottom end portion of one of the side plate of the stabilizing arm so that as the lift beam is cammed upwardly the end of the lift beam is moved upwardly for the fingers to engage each bottom end of the side plate to lift the stabilizing arm; and (5) means to adjust the engagement of the lift beam with the lift plunger and the engagement of the lift beam with the stabilizing arm side plates.

10. A mechanical oscillograph as in claim 9 in which the means to adjust the engagement of the lift beam to the plunger and side plates are adjusting screws threaded into the lift beam.

11. A mechanical oscillograph as in claim 9 in which are provided means movable toward the balance beam said means adapted to engage and guide the balance beam in a prescribed path as it is raised and lowered, and in which is provided means movable to engage the side plates of the stabilizing arm to guide the arm as it is raised and lowered.

12. A mechanical oscillograph as in claim 11 in which the means movable toward the balance beam includes a bridge support attached to the pedestal, said bridge support having a portion thereof disposed above the knife-edge block of the balance beam, this portion having a movable dowel means adapted to be brought to the knife-edge block and to engage a dowel guide in the block; and in which the means movable toward the side plates of the stabilizing arm is a guide arm having a dowel adapted to engage a slot formed in the side plate of the stabilizing arm, said guide arm being adapted for movement from a stored position to an engaging position with the side plate during the lifting of the stabilizing arm and in such position to provide a fixed guide pin for controlling the path movement of travel of the stabilizing arm in a determined vertical path.

13. A mechanical oscillograph for the measuring of the mechanical properties of elastomeric vulcanizates and the like and comprising: (1) a base; (2) a chronograph drum drive assembly carried in a housing adapted for attachment to and disposed in fixed relationship to the base, said drive including a gear motor having output means; an adjustable clutch connecting said output means and a drive shaft said clutch being tensioned so the drive shaft may be rotated independently of the rotation of the motor; a pinion carried on and rotated by the drive shaft; a driven gear engaging the pinion and rotated thereby; a driven shaft carrying the driven gear and movable by the rotation of the gear; bearing means in said housing and in a bearing block carried in the housing, the bearing means adapted to rotatably retain the driven shaft and disposed so that an unsupported outer portion of the shaft extends beyond the bearing means and outwardly from the exterior of the housing; (3) a chronograph drum removably carried by the drum drive assembly; (4) a pedestal carried by the base; (5) a balance beam having a knife edge adapted to pivotally engage and rest on a support portion of the pedestal, the beam disposed for oscillating motion in respect to the base, and the beam having means for carrying on its one end a recording means adapted to be moved toward and to engage the chronograph drum; (6) means to support a plurality of standard weights at more than one location on the balance beam said locations being between the recording end and the knife edge of the beam; (7) a counterweight carried by a threaded rod, the rod fixedly mounted on the balance beam so that as the counterweight is rotated it will move toward or away from the knife edge to provide the desired balance of the balance beam; (8) a flip arm mounted on the balance beam and adapted to be rotated from a non-load to a load position to shift the center of gravity of the beam and attached components to provide a slight over-balance of the beam toward that beam end having the recording means; (9) a stabilizing arm including a knife-edge block having a downwardly directed knife edge adapted to rest upon and be carried by a hardened knife-edge support block mounted in the balance beam as a precisely determined position; (10) an adjustable upper platen attached to the pedestal and adapted to provide a support for one end of a test specimen, and (11) means for holding a test specimen and the like between the upper platen and the hardened knife-edge support block of the stabilizing arm.

14. A mechanical oscillograph as in claim 13 in which the chronograph drum is formed with a top and bottom end plate and joined by a tubular side wall and a slidable guide provided in the lower end plate; said slidable guide having a pair of shoulder means attached to the lower end plate and adapted to engage cooperating shoulder means formed on the outer portion of the driven shaft of the drum drive assembly; a guide bushing mounted in the upper end plate and having a smooth bore adapted to slidably retain the upper end of the driven shaft, said guide bushing also having a threaded outer portion; a knob screw mountable in the threaded outer portion, the knob screw when manipulated to move inwardly or outwardly in the bushing and disposed so that the inner end of the knob screw will engage the end of the driven shaft to move the chronograph drum.

15. A mechanical oscillograph as in claim 14 in which the chronograph drum drive assembly includes a spring bias means to urge the pinion away from the gear and in which there is adjustable means overcoming the spring bias and providing for drawing the pinion into predetermined engagement with the gear so as to control the amount of gear teeth engagement.

References Cited

UNITED STATES PATENTS

| | | | |
|---|---|---|---|
| 39,145 | 7/1863 | Harris | 177—250 |
| 1,686,377 | 10/1928 | Hanson | 308—2 |
| 1,949,721 | 3/1934 | Klopsteg | 177—155 |
| 2,176,016 | 10/1939 | Sivertsen | 346—138 X |
| 2,256,318 | 9/1941 | Hadley | 308—2 |
| 2,259,491 | 10/1941 | Roller | 73—89 |
| 2,611,606 | 9/1952 | Hadley | 265—71 |
| 2,703,492 | 3/1955 | Brissette et al. | 73—94 |
| 2,907,620 | 10/1959 | Van Luik | 346—8 |
| 2,950,100 | 8/1960 | Rapp | 177—155 |
| 3,017,784 | 1/1962 | Monaghan | 74—395 |

JAMES J. GILL, *Primary Examiner.*

RICHARD C. QUEISSER, *Examiner.*

JOSEPH J. SMITH, JAMES H. WILLIAMSON,
*Assistant Examiners.*